UNITED STATES PATENT OFFICE.

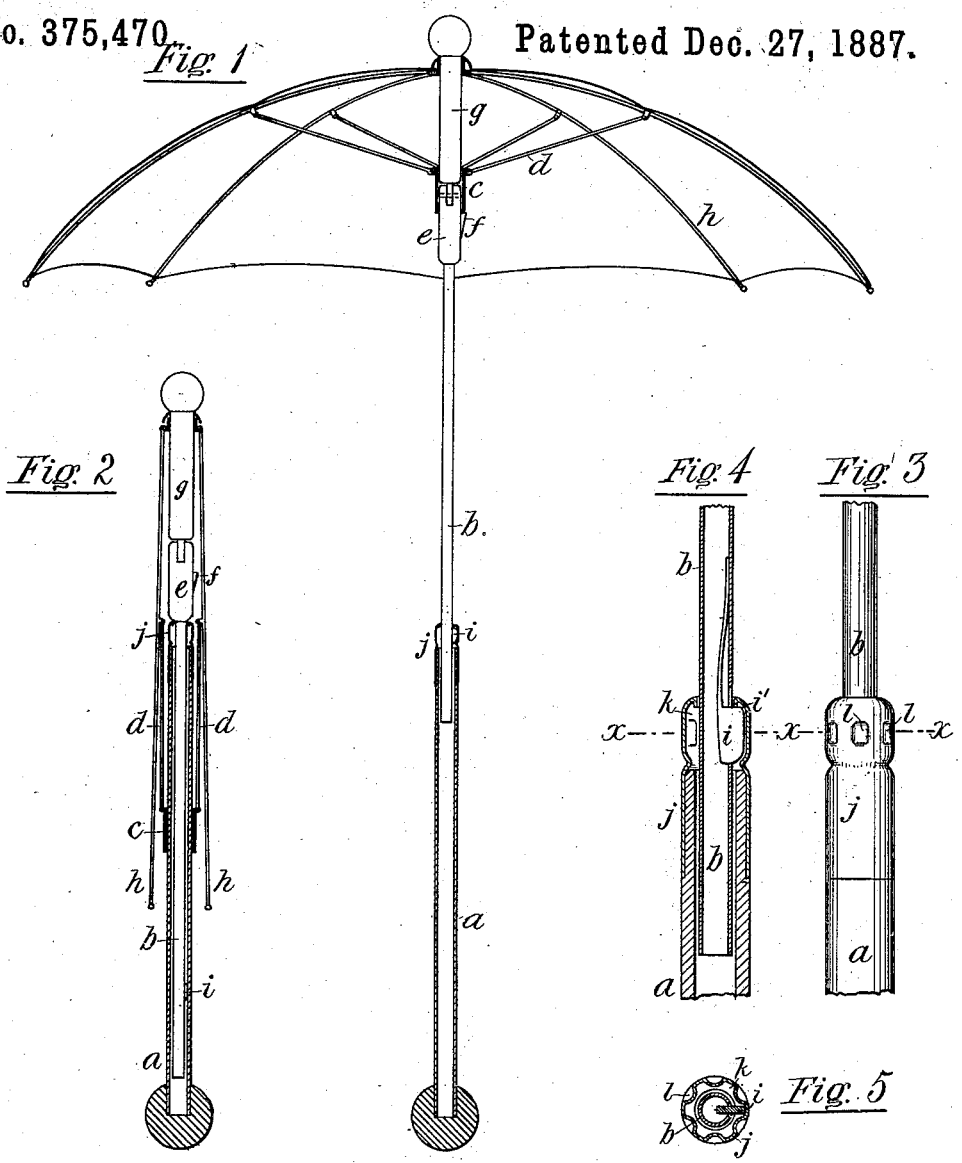

WILLIS H. BELKNAP, OF NEW YORK, N. Y.

PARASOL.

SPECIFICATION forming part of Letters Patent No. 375,470, dated December 27, 1887.

Application filed May 14, 1887. Serial No. 238,202. (No model.)

*To all whom it may concern:*

Be it known that I, WILLIS H. BELKNAP, a citizen of the United States, residing at New York, county and State of New York, have invented certain new and useful Improvements in Parasols, of which the following is a specification.

This invention relates to parasols in which the sticks are made of two or more pieces fitted to slide together telescopically, so as to occupy but little space when not in use, and has for its object to supply a simple and efficient locking device for retaining the parts of the stick in extended position.

The invention consists of a metal cap or sleeve secured to the end of the hollow handle and provided with a chamber larger in diameter than the bore of the handle, with the upper end of the chamber formed to constitute an internal flange, leaving an opening in which the upper part of the stick is free to slide. This upper part is provided with a catch, which springs into the chamber when the stick is drawn out, the upper edge of the catch by coming in contact with the internal flange of the chamber preventing the entire separation of the parts. The lower edge of the catch is rounded to permit the parts of the stick to be closed up by pressing them together, the spring of the catch being sufficiently stiff to hold it within the chamber when the parasol is open and to hold the parts in closed position by frictional contact with the interior of the hollow handle.

To prevent any rotary motion between the parts of the stick when the parasol is in open position, depressions are made in the sides of the chamber, thus forming internal projections therein between which the spring-catch fits; but to describe my invention more particularly, I will now refer to the accompanying drawings, in which—

Figure 1 is a sectional view of a parasol provided with my improvements opened. Fig. 2 is a similar view showing the parasol closed. Fig. 3 is an enlarged view of a part of the telescopic stick. Fig. 4 is a longitudinal section of the same, and Fig. 5 is a transverse section of the same on the line $x\ x$.

The lower part of the stick or handle $a$ is hollow, and in it is fitted to slide the upper part of the stick $b$, which is represented as a hollow metallic rod. The runner $c$, connected to the stretchers $d$, fits over the piece $e$, which is secured to the upper end of the stick and provided with the spring-catch $f$. This piece $e$ is of the same diameter as the handle $a$, and to it is hinged the piece $g$, to which the ribs $h$ are pivoted. The object of the hinge between the pieces $e$ and $g$ is to permit the ribs $h$ and covering, when opened, to be turned over, so as to occupy an angular position in relation to the stick.

There is nothing essentially new in the parasol thus far described, my invention consisting of an improved locking-connection between the hollow handle $a$ and stick $b$, which I will now describe. Fitted in the stick $b$, near its lower end, is the spring-catch $i$, the upper edge, $i'$, of which is flat or slightly undercut and its lower edge rounded. On the upper end of the hollow handle $a$ is firmly secured the metal cap or sleeve $j$, having a chamber, $k$, with the top closed in so as to form an internal flange, leaving a central opening for the stick to slide freely therein. This chamber $k$ has depressions $l$ formed in its sides, thus making a series of internal projections, between which the catch $i$ springs when the stick is extended, as shown at Figs. 4 and 5, and thereby prevents rotation between the handle and stick when the parasol is in open position, so that telescopic sticks provided with this device are for all practical purposes as rigid as solid sticks.

The flat or undercut upper edge, $i'$, of the catch $i$, by coming in contact with the internal flange of the chamber, prevents the complete separation of the two parts as they are drawn out, and while the catch by the resiliency of its spring holds the two parts in open position, the rounded lower edge permits the catch $i$ to be forced out of the chamber $k$ down the interior of the handle $a$ upon the application of longitudinal pressure to both parts of the stick, and when the parasol is in closed position, as shown at Fig. 2, the catch $i$ acts as a friction-brake to hold the handle up in the body of the parasol. In this position the runner $c$ is over the handle $a$.

Having now described my invention, what I claim, and desire to secure by Letters Patent, is—

1. The combination, with a hollow handle and stick adapted to slide therein, of a metal cap or sleeve secured to the upper end of the hollow handle, and provided with a chamber larger than the bore of the bottom handle, and having internal projections, and a catch in the handle arranged to spring into the chamber between the projections when the handle and stick are extended, substantially as set forth.

2. In combination, a hollow handle, a stick adapted to slide therein, a metal cap or sleeve secured to the end of the handle, provided with a chamber larger than the bore of the hollow handle having internal projections and its upper edge formed to constitute an internal flange through which the stick slides, and a spring-catch having its upper edge flat or undercut to stop against the internal flange of the chamber and its lower edge rounded, substantially as set forth.

In testimony whereof I have hereunto set my hand, at New York, county and State of New York, this 12th day of May, 1887.

WILLIS H. BELKNAP.

Witnesses:
E. S. LOWE, Jr.
D. WILLIS MERRITT.